June 8, 1948. I. CISSKI 2,442,756
MOTION PICTURE CAMERA OPERATION-CONTROL MECHANISM
Filed Jan. 12, 1946 4 Sheets-Sheet 1

INVENTOR
Irving Cisski,
BY
Soans, Pond & Anderson
ATTORNEYS

June 8, 1948.　　　　　I. CISSKI　　　　　2,442,756
MOTION PICTURE CAMERA OPERATION-CONTROL MECHANISM
Filed Jan. 12, 1946　　　　　　　　　　　　4 Sheets-Sheet 2

INVENTOR
Irving Cisski,
BY Soans, Pond & Anderson
ATTORNEYS.

June 8, 1948. I. CISSKI 2,442,756
MOTION PICTURE CAMERA OPERATION-CONTROL MECHANISM
Filed Jan. 12, 1946 4 Sheets-Sheet 3
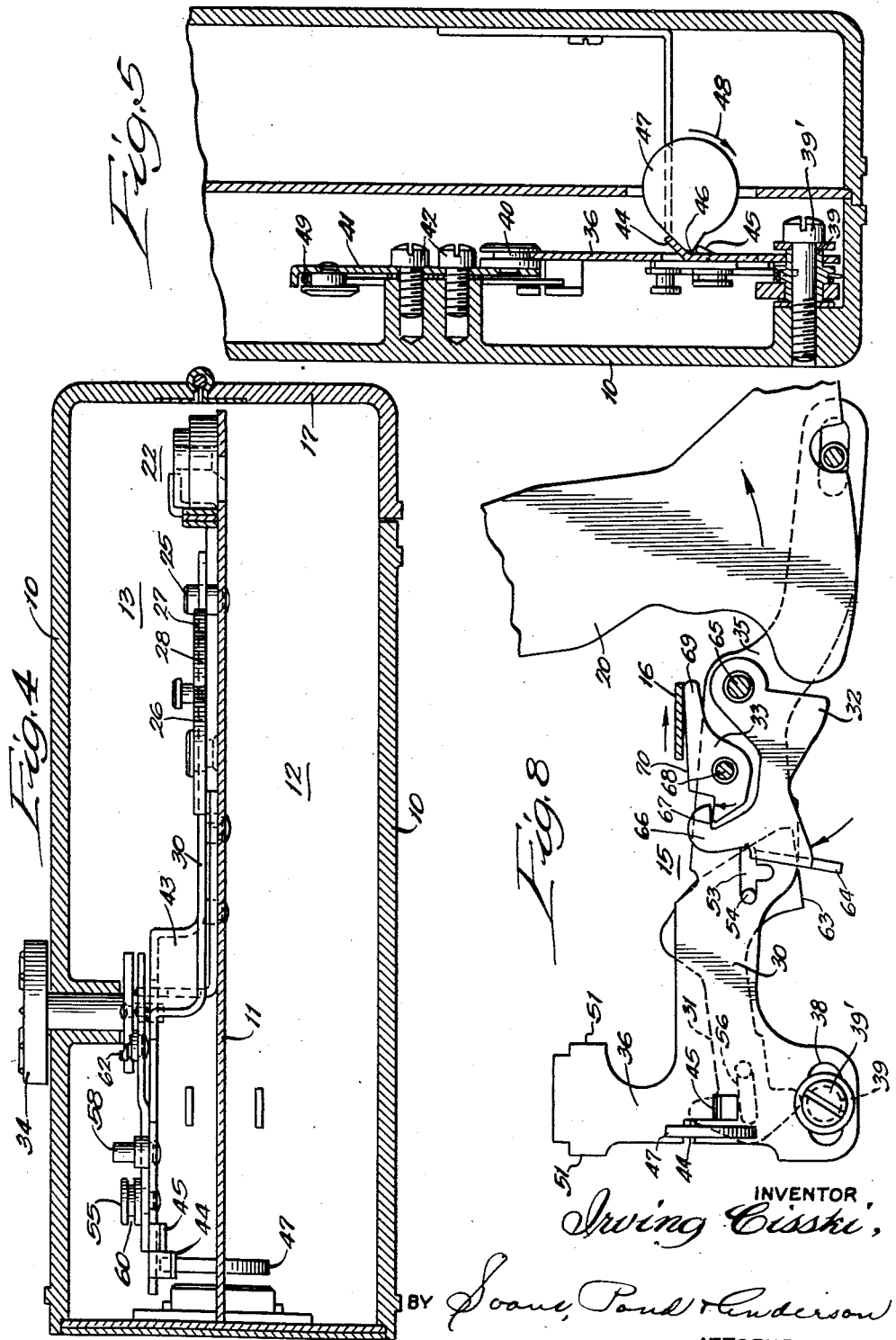
INVENTOR
Irving Cisski,
BY Soans, Pond & Anderson
ATTORNEYS.

June 8, 1948.  I. CISSKI  2,442,756
MOTION PICTURE CAMERA OPERATION-CONTROL MECHANISM
Filed Jan. 12, 1946  4 Sheets-Sheet 4

INVENTOR
Irving Cisski,
BY Soans, Pond & Anderson
ATTORNEYS.

Patented June 8, 1948

2,442,756

UNITED STATES PATENT OFFICE 2,442,756

MOTION-PICTURE CAMERA OPERATION-CONTROL MECHANISM

Irving Cisski, Schiller Park, Ill., assignor to Ampro Corporation, Chicago, Ill., a corporation of Illinois Application January 12, 1946, Serial No. 640,949

7 Claims. (Cl. 88—17)

This invention relates to the control mechanism for motion picture cameras.

In the use of motion picture cameras it is desirable to be able to so control the operation of the motor as to make either a single exposure or a continuing series of exposures. Moreover, it is desirable to render inoperative the mechanism which controls the making of exposures at the moment when the film is being placed in or removed from the camera or when the pull or torque of the motor has dropped below a point where it will operate the film-shutter and -transport mechanism with a speed required for the effective taking of pictures.

The main objects of this invention, therefore, are to provide an improved control mechanism for the exposure-operating mechanism of motion picture cameras which will permit making exposures one at a time or in the usual rapid succession; to provide improved control mechanism of this kind with which is incorporated means adapted to render the operating mechanism ineffective when the film is being placed in or removed from the camera housing or when the torque of the motor has dropped below a predetermined point; and to provide control mechanism of this kind which is particularly suitable for motion picture cameras of the type where the film is encased in a magazine by the film manufacturer for return to it for processing.

The preferred embodiment of this invention is shown in the accompanying drawings, on a scale considerably larger than actual size, in which, Fig. 1 is a side elevation of a motion picture camera wherewith has been incorporated the improved operating control mechanism;

Fig. 4 is a horizontal sectional view taken on the line 4—4 of Fig. 3;

Fig. 5 is a transverse vertical view of the same, taken on the line 5—5 of Fig. 3;

Fig. 8 is a similar view showing the relative position of these operating parts when the magazine-controlled cam member has rendered them ineffective to control the exposure-operating mechanism.

Figure 2:
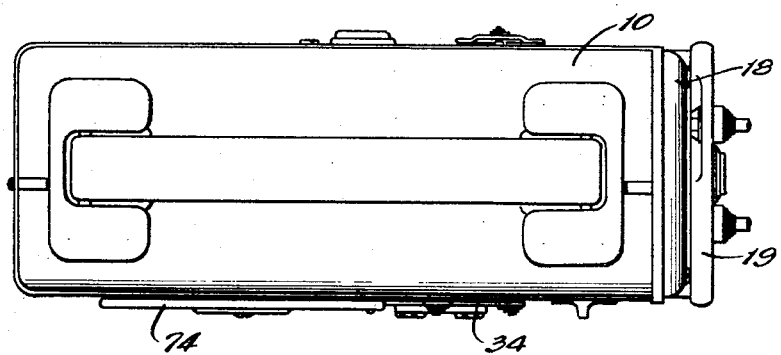
Fig. 2 is a plan view of the same.

A motion picture camera embodying this improved control mechanism for the exposure-operating mechanism comprises, a housing 10 divided by a vertical partition 11 to form a magazine compartment 12 and an operating-mechanism compartment 13, in the latter of which is arranged a motor (not shown) in association with a torque-controlled actuator 14. The usual train of gears (not shown) connects the motor to operate a film-shutter and -transport mechanism (not shown) as permitted by this improved control mechanism 15, unless it is otherwise rendered ineffective by a movement of the torque-controlled actuator 14 or the magazine-controlled cam member 16.

The housing 10 is provided with a hinged door 17 which when open permits the insertion of a magazine into or its removal from the compartment 12 and the consequent control of mechanism effecting the shifting of the cam member 16, as will more fully appear from co-pending application Serial No. 640,951, filed January 12, 1946. At the front of this housing is an end cap 18 wherein is mounted a film-shutter and -transport mechanism of the type disclosed in co-pending application Ser. No. 640,952, filed January 12, 1946, and on which is mounted a lens turret 19.

The construction and operation of torque-controlled actuator 14 is fully disclosed in co-pending application Serial No. 640,957, filed January 12, 1946. This actuator 14 comprises an arm 20 swingably mounted on a shaft 21 to which the spring of the motor is attached. The arm has a limited swinging movement in opposite directions under the force of the torque of the spring motor or the adjustable resilient means 22—depending upon which is the stronger—as may be permitted by the engagement of the shoulders 23 and 24 against the pin 25. The torque of the spring motor is exerted on the arm 20, by means of discs 26, 27, and 28, so as to swing the arm counterclockwise, as shown by the arrow in Fig. 3. The peripheries of the discs 26 and 27 are urged into contact with the periphery of the disc 28 by means of a spring 29.

Up to a certain point in its unwinding, the torque of the spring motor will hold the arm 20 in what might be termed its retracted position, with the shoulder 23 pressing against the pin 25. When the torque drops so that its force on the arm 20 becomes less than the pressure exerted by the adjustable resilient means 22, the bottom of the arm will be swung in a clockwise direction so as to render the control mechanism 15 inoperative, as will more fully hereinafter appear.

The control mechanism 15 herein shown comprises, a trigger bar 30, a pin-retracting lever 31, a cam rocker arm 32, and a cam lever 33, so associated that upon the shifting of a starting dial 34 (see Fig. 1), the spring motor will cause the operation of the film-shutter and -transport mechanism, unless the operative relationship of the afore-named parts has been rendered ineffective by a shifting of the torque-actuated arm 20 or the magazine-controlled cam member 16.

The trigger bar 30 approximates the form a T, with the stem 35 extending nearly the full length of the housing 10 and with the transverse part 36 located near the forward end of the housing adjacent to the end cap 18, wherein is enclosed the film-shutter and -transport mechanism. The trigger bar is slotted at 37 and 38 whereby it is slidably supported on the pin 25, which is secured to the partition 11, and a bushing 39, mounted on a machine screw 39' secured to the adjacent housing 10. The bar 30 is guided in its sliding movement by having the upper end of the transverse part 36 received in flanged roller 40 mounted on a plate 41 secured to the housing 10 by means of screws 42. As will be noted more particularly from Fig. 4, the trigger arm 30 has the forward and rear portions of the stem offset at 43 so that the forward portion of the stem 35 and the transverse part 36 are located about halfway between the partition 11 and the adjacent wall of the housing 10.

Tongues or stops 44 and 45 are upset from the transverse part 36 of the trigger bar 30 so that upon the shifting of the trigger bar 30 one or the other may be moved into and out of engagement with a shoulder 46 on a trigger cam 47. The cam 47, being connected to the motor mechanism through a suitable gear train, rotates in the direction of the arrow 48 when the trigger bar 30 is shifted to move one or the other of the stops 44 or 45 out of the path of said trigger cam shoulder 46.

The trigger bar 30 is held in its normal or neutral position, with the stop 44 engaged by the shoulder 46 on the cam disc 47, by means of a hairpin-shaped spring 49 secured at the upper end of the plate 41 so that the ends 50 of the spring bear against and are retained in position by the flanged ears 51 formed on the upper end of the transverse part 36 of said trigger bar 30. Comparable flanged ears 52, formed on the bracket 41, engage the respective legs of the spring 49 and limit them to movement in but one direction.

A T-shaped slot 53 is formed in the stem 35 of the trigger bar 30, a little less than half the distance of its length from the transverse part 36. The slot 53 receives a pin 54 carried on the pin-retracting lever 31.

The pin-retracting lever 31 simulates the shape of a pistol and is supported on the trigger bar 30 on a sliding pivot formed by a pin 55 secured to the trigger bar 30 and extending through a slot 56 formed in the forward end of the pin-retracting lever 31. A spring 57, secured by a pin 58 on the trigger bar 30, has the end 59 thereof received in a slot 60 formed in the pin 55 and the other end 61 pressing against a pin 62 on the pin-retracting lever 31. The pin 54 is thereby urged into the bottom of the stem of the T-shaped slot 53 in the trigger bar 30, so that the trigger bar 30 and the pin-retracting lever 31 will move as a unit, and the bottom edge 63 of the rear end of the pin-retracting lever 31 is positioned for engagement by a shoulder 64 on the cam rocker arm 32, as will more fully hereinafter appear.

The cam rocker arm 32 is pivoted to a pin 65 secured to the partition 11. With the camera in its normal upright position the weight of the cam rocker arm 32 retracts it from the edge 63 of the lever 31, unless, perchance, the balance of the cam lever 33 should be such that the engagement of the hook 66 with the shoulder 67 on the cam lever 33 will cause the shoulder 64 on the cam rocker arm 32 to be held in contact with said edge 63. On the other hand, the balance of the cam lever 33 may be such that the lower edge of the shoulder part 64 may rest on the bottom of the camera housing. Should the camera be placed in an inverted position, the weight of the cam rocker arm 32 will cause the shoulder 64 to rest against the edge 63 of the pin-retracting lever 31. However, the spring 57 will prevent the cam rocker arm 32 from having any effect on the lever 31.

The cam lever 33 is pivoted on a pin 68 secured to the partition 11. The pin 68 is positioned in the cam lever 33 so that the end 69 of the lever overbalances the other end. Thus the shoulder 67 is normally held against the hook 66 of the cam rocker arm 32. This mounting of the cam lever 33 locates the inclined surface 70 of the end 69 in the path of the magazine-controlled cam member 16, so that the movement of the latter to the right of Fig. 3 will depress the outer end 69 of the cam lever 33. This, in turn, will cause an elevation of the rocker arm 32 so as to raise the inner end of the pin-retracting lever 31 and render the control mechanism 15 inoperative, as will more fully hereinafter appear.

The starting dial 34 (see Fig. 1), which is mounted on the external right-hand side of the camera housing 10, is connected to a disc 71 (see Fig. 3) journaled on the housing and mounting a pin 72 on the inner face thereof. The pin 72 extends into an elongated slot 73 formed in the pin-retracting lever 31 in vertical alinement with the stem part of the T-slot 53 in the trigger bar 30.

Figure 1:
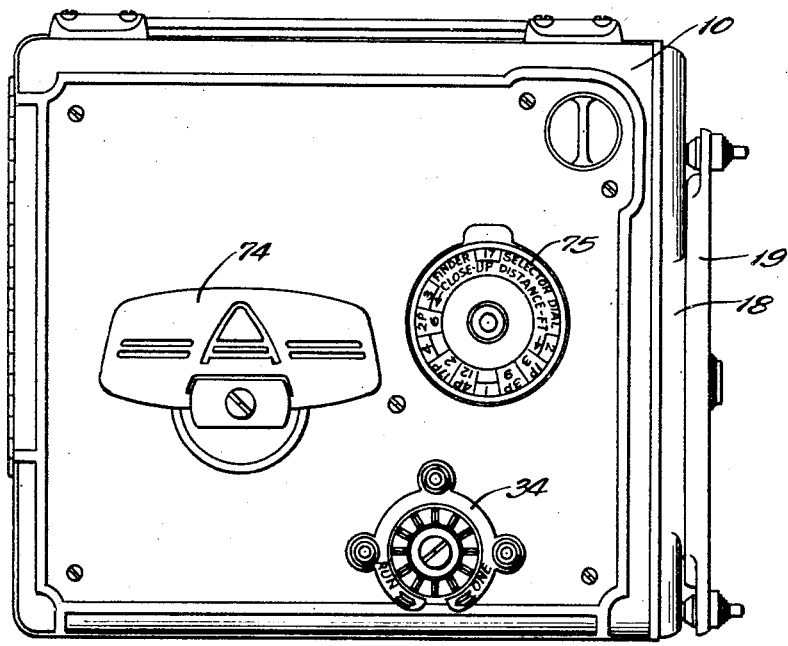

The mounting of the trigger cam 47 and its connection with a spring motor is not shown herein. The details of this, however, are shown in co-pending application Ser. No. 640,955, filed January 12, 1946. It will be understood, however, that this trigger cam 47 is mounted on a suitable shaft and normally driven by a motor through a suitable gear train in a clockwise direction as indicated by the arrow 48 in Fig. 5. A winding key 74 for the motor is shown in Fig. 1. In this same figure is shown a dial indicator 75 which is used in connection with the motion picture camera view-finder masking device shown in co-pending application Ser. No. 640,954, filed January 12, 1946.

The operation of this improved control mechanism is as follows:

Assume that the motor (not shown) has been fully wound up by the key 74. Assume, also, that the starting dial 34 is in its normal non-run position, as shown in Fig. 1, in which case the trigger cam 47 will be held against rotation by the stop 44 on the trigger bar 30.

Figure 3:
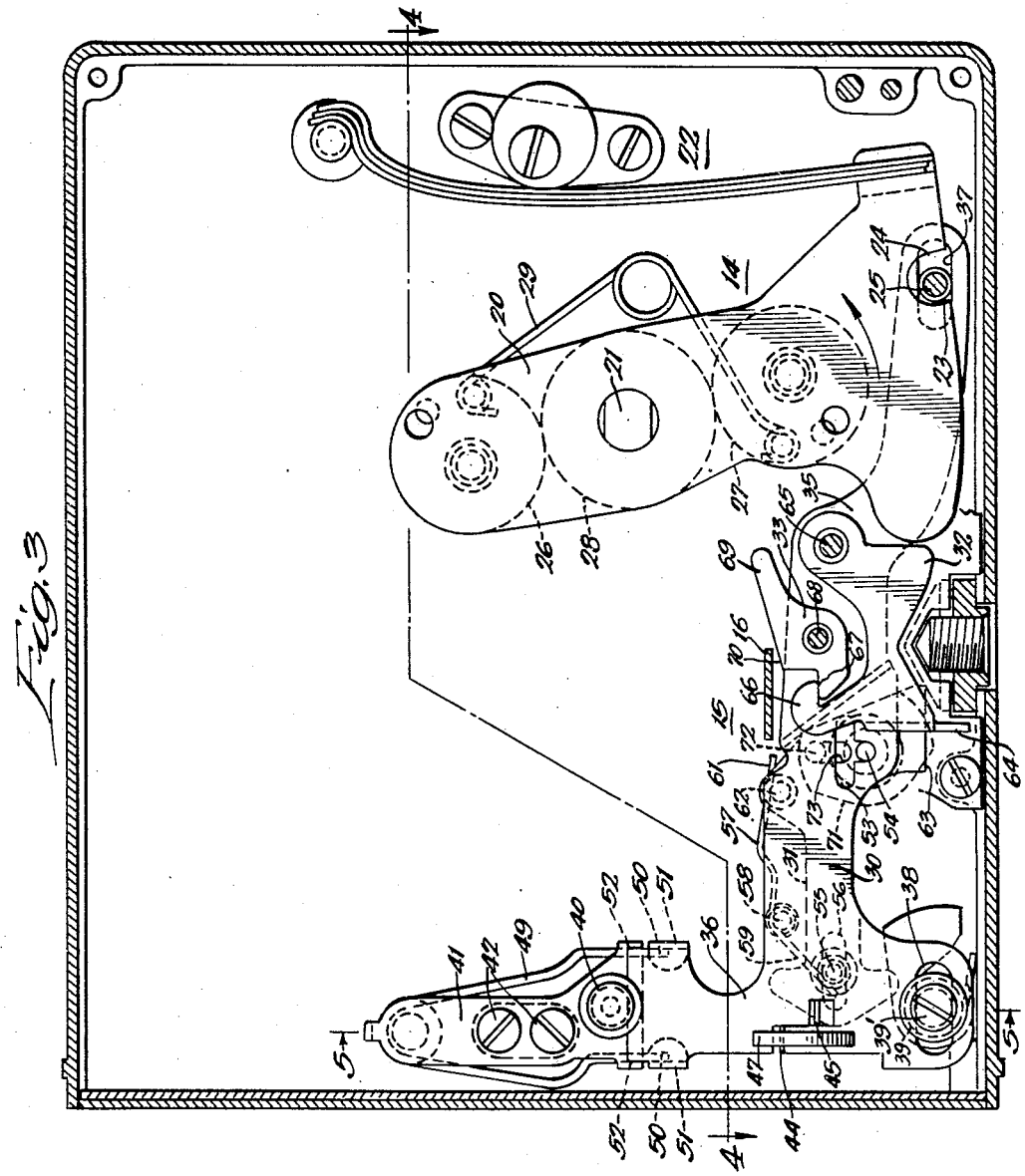
Fig. 3 is a further enlarged transverse sectional view of the camera showing in elevation the related parts of a control mechanism constructed in accordance with this invention and its association with the torque-controlled actuator and the magazine-operated cam member, the predetermined movement of either of which is adapted to render the operating mechanism ineffective.

All of the parts will be in the position of rest shown in Fig. 3. The torque of the motor acting through the shaft 21 and the discs 26, 27, and 28 will tend to swing the arm 20 against the action of the adjustable resilient means 22. This will bring the shoulder 23 into contact with the pin 25.

Whether the operator wants to take "one" picture or a continuous "run," the functioning of these parts will be the same. However, for the purpose of simplicity, the functioning will be described only as it relates to a continuous run. For that purpose the operator shifts the control dial 34 in the direction of the "Run" arrow shown thereon (see Fig. 1). This movement of the dial shifts the pin 72 clockwise, as viewed from Fig. 3. The pin 72, being in engagement in the slot 73 formed in the pin-retracting lever 31, shifts said lever to the right of Fig. 3. By reason of the fact that the pin 54 on the lever 31 is held in the stem part of the slot 53 in the trigger bar 30, by means of the spring 57, the movement of the lever 31 causes a simultaneous movement of the trigger bar 30, to the right of Fig. 3 against the action of the left-hand leg of the spring 49. This movement of the trigger bar 30 retracts the stop 44 from the path of the shoulder 46 on trigger cam 47 and allows it to rotate in a clockwise direction. The consequent freedom of the motor to operate will cause a constant movement of the film-shutter and -transport mechanism in the manner set forth in the aforesaid co-pending application Ser. No. 640,952. This operation of the film-shutter and -transport mechanism will continue until the starting dial 34 is released. The release of the dial 34 permits the tensioned left-hand leg of the spring 49 to shift the trigger bar 30, and the pin-retracting lever 31, to the left of Fig. 3, bringing the stop 44 back into the path of the shoulder 46 on the trigger cam 47, whereupon all the parts will again be in rest position.

Figure 6:
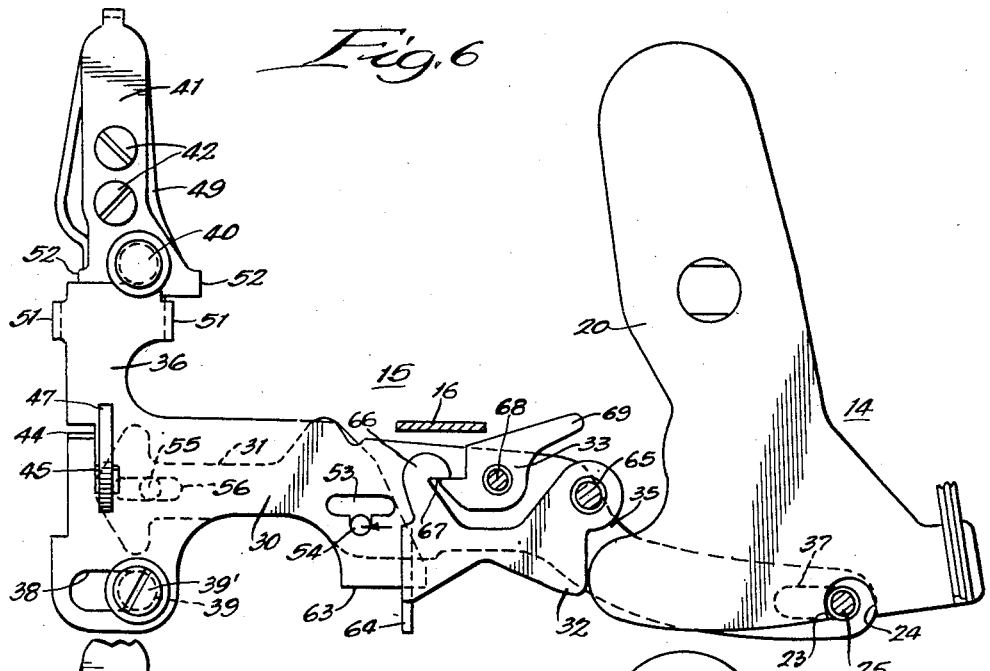
Fig. 6 is a view in elevation of the control mechanism, and the torque-controlled actuator shown in Fig. 3, with the parts shifted to permit a certain operation of the film-shutter and -transport mechanism.

If the starting dial 34 is shifted in the direction of the "one" arrow (see Fig. 1), the trigger bar 30, because of the connections and the movement of the parts previously referred to, will move to the left of Fig. 3. This will move the stop 44 on the trigger bar 30 out of the path of the shoulder 46 on the trigger cam 47, but will move the stop 45 into the path of the said trigger cam shoulder. This will allow the trigger cam to rotate slightly less than one complete rotation. The position of the trigger bar 30, pin-retracting lever 31, cam rocker arm 32, and cam lever 33 for such a shifting of the operating dial 34, is shown in Fig. 6.

When the starting dial is released from the "one" direction shift the stop 45 will be retracted, but the trigger-bar stop 44 will be moved back into the path of the shoulder 46 on the trigger cam 47, allowing the parts of the control mechanism to again come to rest.

The resilient means 22 is so adjustable that, if at any time during the revolving of the trigger cam 47 the torque of the motor begins to approach a condition where it would not move the film-shutter and -transport mechanism with proper speed, the lower end of the arm 20 will move to the left of Fig. 3. This movement of the arm will continue as the torque drops until the lower left-hand end of the arm 20, acting as a cam, swings the left-hand end of the rocker arm 32 upwardly around the pin 65, causing the shoulder 64 to lift the pin-retracting lever 31, shifting the pin 54 out of the stem part of the T-slot 53 in the trigger bar 30. When the pin 54 enters the transverse part of the T-slot 53, the spring 49 causes the trigger bar 30 to move independently of the pin-retracting lever 31 to its rest position.

The previous retraction of the trigger bar 30 in either direction, as hereinbefore explained, will place one leg or the other of the spring 49 under tension. Thus the shifting of the pin 54 into the transverse part of the slot 53 will allow the spring 49 to return the trigger bar 30 to its normal position. This will move the stop 44 into the path of the trigger cam 47, and arrest further operation of the film-shutter and -transport mechanism, regardless of the fact that the starting dial 34 may still be held in the "Run" position.

Figure 7:
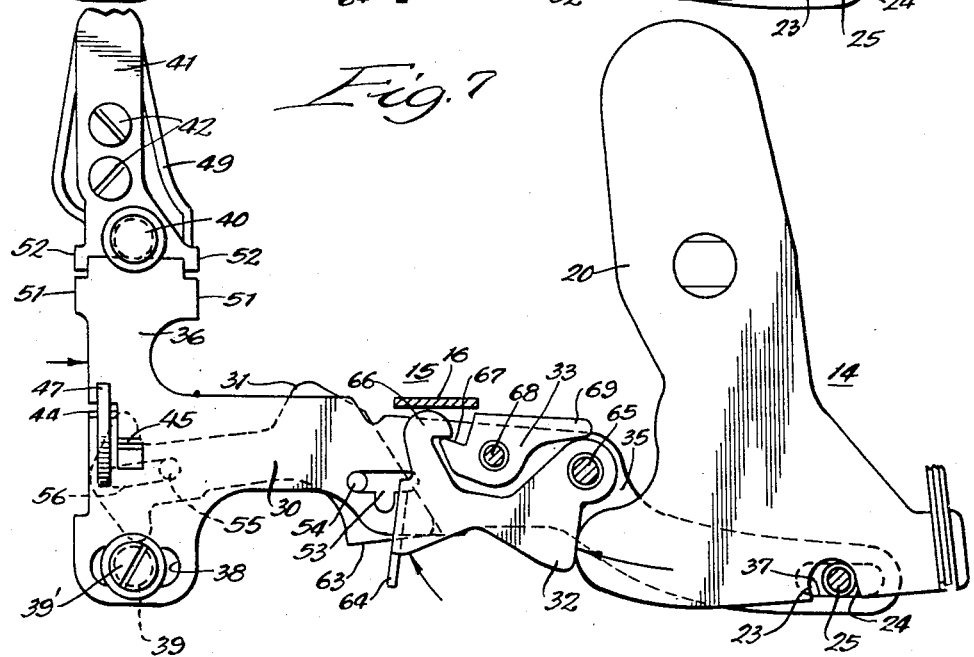
Fig. 7 is a similar view but showing the relative position of the parts when the torque-controlled actuator has rendered them ineffective for controlling the exposure-operating mechanism.

The relative positions of the trigger bar 30 to the pin-retracting lever 31, the cam rocker arm 32, and cam lever 33, under the circumstance just described, are shown in Fig. 7.

As explained in the aforesaid co-pending application Serial No. 640,951, when a film magazine is removed from the magazine compartment 12 of the camera housing 10, the cam member 16 is shifted to the right of Fig. 3. This shifting of the cam member 16 causes it to contact the inclined surface 70 on the cam lever 33 and depress the outer end 69 thereof. Such depression of the lever 33 will cause the shoulder 67, engaging the hook 66 on the rocker arm 32, to elevate the shoulder 64 thereby lifting the pin-retracting lever 31. As hereinbefore explained, this will move the pin 54 from the stem part into the transverse part of the T-shaped slot 53 in the trigger bar 30. This releases the trigger bar 30, permitting the spring 49 to return the trigger bar to its normal position, with the stop 44 located in the path of the trigger cam 47. The relative positions of the several parts under such action of the cam 16 are shown in Fig. 8.

From the foregoing it will be obvious that whenever the motor is rewound, or whenever the cam member 16 is retracted, the spring 57 will return and hold the pin 54 on the lever 31 in the bottom of the step of the T-shaped slot 53 so that the camera is ready for operation.

Variations and modifications in the details of structure and arrangement of the parts may be restored to within the spirit and coverage of the appended claims.

I claim:

1. In a motion picture camera, the combination with a motor-driven film-shutter and -transport shaft having a trigger pawl rotatable therewith, of a trigger bar movable into and out of the path of said pawl, resilient means normally urging said bar into the path of said pawl, other means normally engaging said trigger bar and adapted to be actuated for shifting said bar against the action of said resilient means to retract said bar from engagement with said trigger pawl, normally-retracted means actuatable for releasing said other means from operative engagement with said trigger bar, and a pair of members each independently shiftable into and out of position to engage and actuate said normally-retracted means to effect the release of said other means from engagement with said trigger bar.

2. In a motion picture camera, the combination with a motor-driven film-shutter and -transport shaft having a trigger pawl rotatable therewith, of a trigger bar movable in either direction into and out of the path of said pawl, resilient means normally urging said bar into the path of said pawl, other means normally engaging said trigger bar and adapted to be actuated for shifting said bar against the action of said resilient means to retract said bar from engagement with said trigger pawl, normally-retracted means actuatable for releasing said other means from operative engagement with said trigger bar, and a pair of members connected to different movable parts of said camera mechanism and independently shiftable into and out of position to engage and actuate said normally-retracted means to effect the release of said other means from engagement with said trigger bar.

3. In a motion picture camera, the combination with a motor-driven film-shutter and -transport shaft having a trigger pawl rotatable therewith, of a trigger bar movable into and out of the path of said pawl, resilient means normally urging said bar into the path of said pawl, other means normally engaging said trigger bar and adapted to be actuated for shifting said bar against the action of said resilient means to retract said bar from engagement with said trigger pawl, normally-retracted means actuatable for releasing said other means from operative engagement with said trigger bar, and a pair of members shiftable into and out of position to engage said normally-retracted means to effect the release of said other means from engagement with said trigger bar, one of said members being positioned to be shifted into and out of engagement with said other means by the removal and replacement respectively of the film means in said camera, the other said member being positioned to be shifted into and out of engagement with said other means by a condition of the camera motor mechanism.

4. In a motion picture camera, the combination with a motor-driven film-shutter and -transport shaft having a trigger pawl rotatable therewith, of a trigger bar movable into and out of the path of said pawl, resilient means normally urging said bar into the path of said pawl, a lever bar mounted on said trigger bar on a sliding pivot, interlocking shoulders on said lever bar and trigger bar, resilient means normally urging said lever bar relative to said trigger bar to hold said shoulders in interlocking engagement to permit the concurrent movement of said bars, a rocker arm pivoted adjacent to said trigger bar and having a shoulder adapted for contact with said lever bar, a cam lever pivoted in position to engage said rocker arm, cam members one of which is adapted to engage said rocker arm and the other of which is adapted to engage said cam lever, the movement of either of said cam members being adapted to shift said lever bar to disengage said interlocking shoulders, and means for effecting the movement of said cams.

5. In a motion picture camera, the combination with a motor-driven film-shutter and -transport shaft having a trigger pawl rotatable therewith, of a trigger bar movable into and out of the path of said pawl, resilient means normally urging said bar into the path of said pawl, a lever bar mounted on said trigger bar on a sliding pivot, interlocking shoulders on said lever bar and trigger bar, resilient means normally urging said lever bar relative to said trigger bar to hold said shoulders in interlocking engagement to permit the concurrent movement of said bars, a rocker arm pivoted adjacent to said trigger bar and having a shoulder adapted for contact with said lever bar, a cam lever pivoted in position to engage said rocker arm, and cam members one of which is adapted to engage said rocker arm and the other of which is adapted to engage said cam lever, the movement of either of said cam members being adapted to shift said lever bar to disengage said interlocking shoulders, one of said cam members being actuatable by the removal and replacement respectively of the film means in said camera, the other said cam member being actuatable by means influenced by a condition of the camera motor mechanism.

6. In a motion picture camera, the combination with a motor-driven film-shutter and -transport shaft having a trigger pawl rotatable therewith, of a trigger bar having a pair of stops thereon adapted to be moved into and out of the path of said pawl through the opposite shifting of said trigger bar to permit a single or continuous rotation of said shaft, a spring normally urging said trigger bar into a neutral position to arrest the rotation of said shaft, a lever bar mounted on said trigger bar on a sliding pivot, a pin on said lever bar extending into a T-slot in said trigger bar, a spring on said trigger bar normally urging said lever bar to position said pin in the stem part of said T-slot, a rocker arm pivoted adjacent to said trigger bar and having a shoulder adapted for contact with said lever bar, a hook on said rocker arm, a cam lever pivoted adjacent to said lever bar and adapted to engage said hook, and a pair of cam members positioned adjacent to said lever bar and said cam lever respectively so as to individually effect a shifting of said rocker arm to disengage said pin from said T-shaped slot.

7. In a motion picture camera, the combination with a housing having a magazine compartment and a motor-mechanism compartment, the former having means therein shiftable incident to the insertion and removal of the magazine from said compartment and the latter having a motor therein connected to operate a film-shutter and -transport shaft to which is rotatably connected a trigger pawl, of a rocker arm connected to be swung in one direction by the torque of said motor, yielding means counteracting the swing of said arm and adapted to shift it in the opposite direction when the torque of said motor drops below a predetermined amount, a trigger bar movable into and out of the path of said trigger pawl, resilient means normally urging said trigger bar into the path of said trigger cam, a lever bar mounted on said trigger bar on a sliding pivot, interlocking shoulders on said lever bar and trigger bar, other resilient means normally urging said lever bar relative to said trigger bar to hold said shoulders in interlocking engagement to permit the concurrent movement of said bars, a second rocker arm pivoted adjacent to said trigger bar and having a shoulder adapted for contact with said lever bar, cam means formed on said first rocker arm and positioned to engage and shift said second rocker arm to release said lever bar from said trigger bar when said yielding means shifts said first-mentioned rocker arm against the dropping torque of said motor, a second cam member located adjacent to said cam lever and connected to be operated by said magazine-controlled means to retract said cam lever for shifting said second rocker arm to release said lever bar from said trigger bar when a film magazine is removed from said magazine compartment.

IRVING CISSKI.

REFERENCES CITED

The following references are of record in the file of this patent:

UNITED STATES PATENTS

| Number | Name | Date |
| --- | --- | --- |
| 1,960,061 | Morsbach | May 22, 1934 |
| 1,960,062 | Morsbach et al. | May 22, 1934 |
| 2,028,608 | Howell | Jan. 21, 1936 |
| 2,080,021 | Wittel | May 11, 1937 |
| 2,323,576 | Sperry | July 6, 1943 |